United States Patent [19]

Rastelli

[11] Patent Number: 4,685,311

[45] Date of Patent: Aug. 11, 1987

[54] FOOD PREPARATION TABLE HAVING A REFRIGERATED INGREDIENT ZONE

[75] Inventor: Agostino A. Rastelli, Grove City, Ohio

[73] Assignee: Leitner Corporation, Columbus, Ohio

[21] Appl. No.: 806,672

[22] Filed: Dec. 9, 1985

[51] Int. Cl.[4] ............................................. F25D 23/12
[52] U.S. Cl. ........................................ 62/258; 62/255
[58] Field of Search .................... 62/258, 261, 255; 312/236

[56] References Cited

U.S. PATENT DOCUMENTS

| | | | |
|---|---|---|---|
| 1,610,626 | 12/1926 | Smith | 62/258 X |
| 1,638,041 | 8/1927 | Korkames | 62/258 X |
| 2,156,795 | 5/1939 | Smith | 62/254 |
| 2,437,257 | 3/1948 | Johnson | 62/258 X |
| 2,463,658 | 3/1949 | Thrasher | 62/258 X |
| 2,614,401 | 10/1952 | Roberts | 62/258 |
| 2,632,310 | 3/1953 | Kopp et al. | 62/255 X |
| 2,786,337 | 3/1957 | Spring | 62/258 |
| 2,886,395 | 5/1959 | Cohn | 62/258 X |
| 4,457,140 | 7/1984 | Rastelli | 62/261 |

Primary Examiner—William E. Tapolcai
Attorney, Agent, or Firm—Porter, Wright, Morris & Arthur

[57] ABSTRACT

A food preparation table in which perishable ingredients are maintained in a refrigerated state in a conveniently accessible location to a food preparer. The table includes means for providing the circulation of refrigerated air over the ingredients as well as in an adjacent refrigerator cabinet. Collecting trays adjacent the table surface are also refrigerated and preserve surplus ingredients which would otherwise be wasted in the food preparation process.

4 Claims, 6 Drawing Figures

FIG. I

FOOD PREPARATION TABLE HAVING A REFRIGERATED INGREDIENT ZONE

FIELD OF THE INVENTION

This invention relates to refrigerator units and food preparation tables generally useful in commerical "fast food" or quick service establishments where foodstuffs such as pizza, tacos, salads and the like are prepared in volume quantities and served to a customer.

BACKGROUND OF THE PRIOR ART

In general, the preparation of foods such as pizza or salad requires convenient access by the preparer to ingredients or condiments such as dairy products, vegetables, meats and dough, etc., which are normally preserved in a state of "freshness" by refrigeration. Typically, quantities of different ingredients or condiments such as cheeses, peppers, mushrooms, sausage are kept in spearate trays for use by the food preparer for assembly into the finished foodstuff. The preparer works at a "make up" table where the separate ingredients are combined into the finished food product.

Problems occur in maintaining sufficient quantities of the ingredients conveniently available in a refrigerated state in a kitchen to preserve their freshness. Typically, ambient kitchen temperature is about 80°-85° F.; perishable foodstuffs must be maintained at about 40° F. Thus, ice has been used to surround condiment or ingredient trays; and trays have been surrounded at their bottom and sides by circulating refrigerated air. These methods of maintaining the refrigerated temperature of foodstuff trays have not proven satisfactory, however, because the refrigeration generally reaches only the bottom and sides of the tray, and the top of the tray is exposed to ambient room heat. The temperature gradient through the volume or mass of the condiments in the tray is non-uniform. For example, icing may occur at the sides and bottom, and the top or center may be warm. Spoilage may occur. Storage of ingredients in an enclosed refrigerator is frequently inconvenient in a volume kitchen.

Dairy products are particularly prone to spoilage if not maintained at a refrigerated temperature below about 40° to 45° F. Above this temperature bacteria will grow. The problem of spoilage is not only a health concern but is also a matter of economic consequence in restaurant operations. For example, cheese is frequently the most expensive ingredient of a pizza; for this reason spoilage and waste of a voluable dairy product should be avoided.

In addition, many local health codes regulating the operation of food establishments require that the temperature of food ingredients be maintained at approximately 40° F. so that bacteria growth, and the consequent risk of food poisoning is reduced.

OBJECTS OF THE INVENTION

It is a principal object of this invention to provide an accessible array of food ingredients in an area convenient to a food preparer in a refrigerated environment which avoids bacterial growth and satisfies the requirements of restaurant health codes. Thus, waste and spoilage of perishable foods such as cheese and dairy products, will be reduced.

It is also an object of this invention to provide a commercial refrigeration unit, included in a food preparation table in which a controlled circulation of refrigerated air maintains condiments and/or ingredients in separate accessible trays at a uninform refrigerated temperature.

It is a further object to provide a refrigerated condiment zone in conjunction with a food preparation table whereby condiments in separate trays are readily accessible by the food preparer, but are nevertheless maintained in a continuously temperature controlled refrigeration zone that is protected from the ambient environment. And it is also an object to provide a collection area for unused or "waste" ingredients whereby these by-products of the food preparation process are collected, and preserved at a refrigerated temperature, for re-use without spoilage or contamination.

Thus it is an object to accommodate the need of a food preparer working in a warm kitchen environment for convenient access to diverse food ingredients and to maintain and conserve such food ingredients in a refrigerated state to retard spoilage. In this manner, efficiency in the preparation of food, conservation of ingredients, and health considerations are realized.

These and other objects of the invention may be understood with reference to the following drawings and description of the preferred embodiment.

DESCRIPTION OF THE PREFERRED EMBODIMENT

Figure 1:
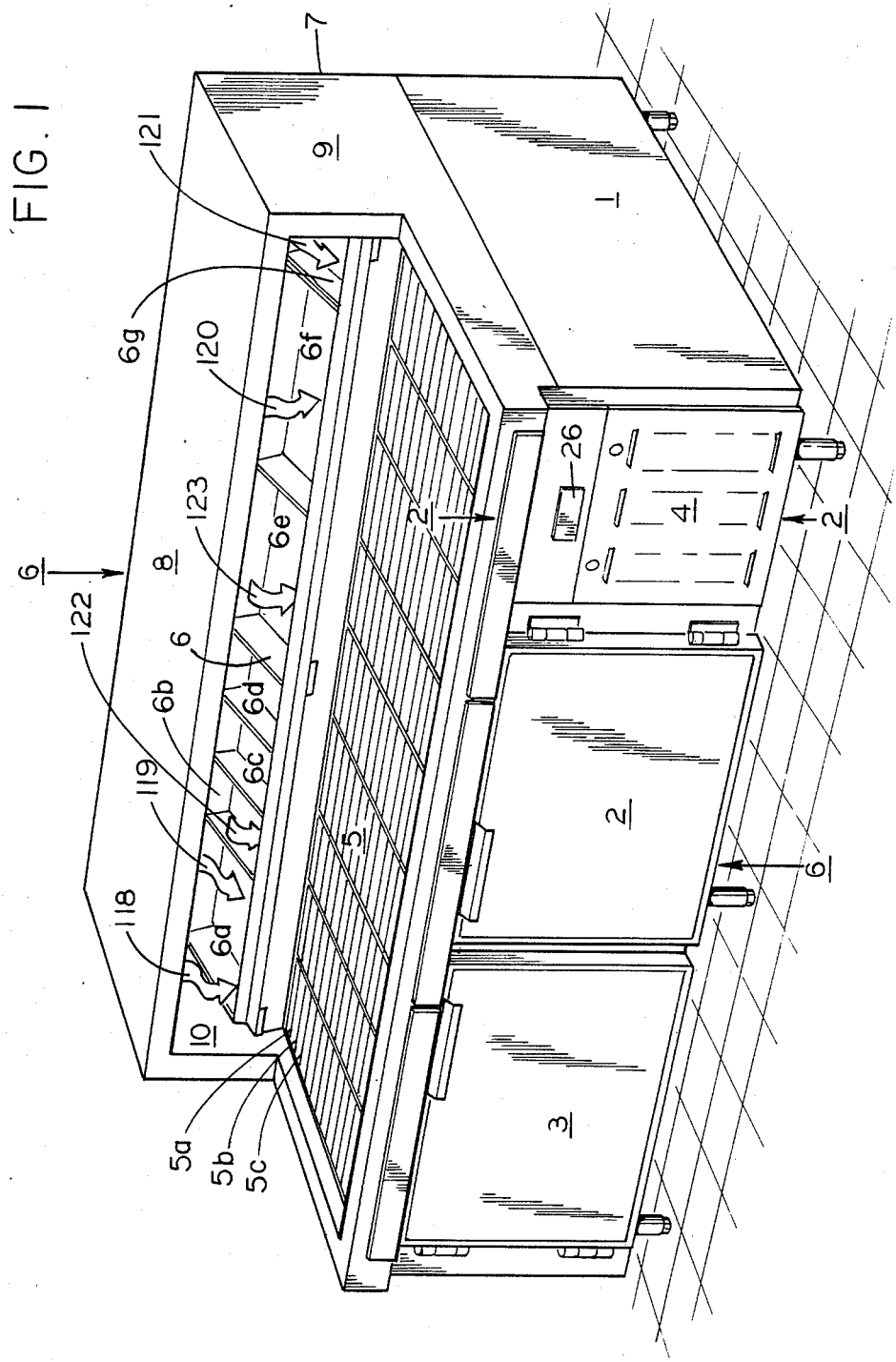
FIG. 1 is a view of the food preparation table and refrigerator cabinet having the refrigerated ingredient zone.

With reference to FIG. 1, a refrigerator cabinet 1, is provided having doors 2 and 3, that provide access to an enclosed refrigerator cabinet volume. An equipment zone including a refrigeration unit having a motor, compressor, coil and othe other mechanisms, such as a thermostat and the like, which are conventional in the refrigerator art, is provided in a separate accessible volume 4. A food preparation surface, generally comprising an extended plane at a convenient height is shown at 5. This table surface is the work or "make up" zone on which the ingredients are assembled in the preparation of the foodstuff. The refrigerated zone for food preparation ingredients, 6, which is conveniently accessible to the food preparer, includes a series of condiment trays 6a-6g enclosed by a back 7, (not visible), top 8, and two sides 9 and 10. The trays hold the volume quantities of separate food ingredients required in a commercial food service establishment such as a pizza restaurant.

Figure 2:
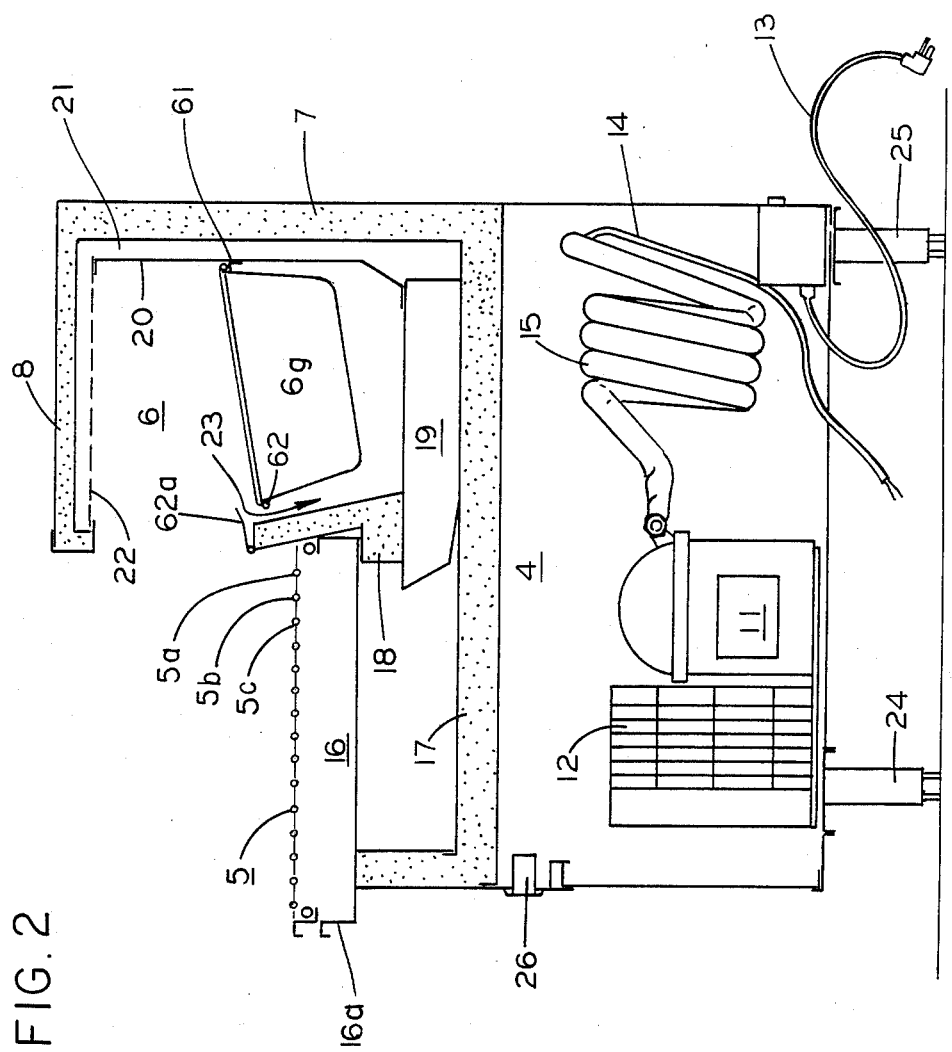
FIG. 2 is a side cross-section view of the unit of FIG. 1 taken at section 2—2 showing relative positions of the food zone, trays and refrigeration source.

The cross section view in FIG. 2 shows the like numbered elements of the cabinet of FIG. 1 and in greater detail shows, in the equipment zone 4, the pump 11, condenser 12, electrical connection 13, evaporation drain hose for condensate, 14 and an extendable coiled refrigeration line, 15, which is useful when the unit requires service. Rear bracket 61, adjacent back 7, and front rail 62, provide a support for the condiment trays which are suspended between the bracket and rail from a flanged upper portion of the tray. Other support means for the trays in the same relative position may be used. The trays may be angularly disposed to the front of the cabinet, if desired, for greater visibility of, or easier access to, the contents.

The food preparation surace is shown at 5 comprising an arrangement of spaced extending rod elements such as 5a, 5b, 5c, etc. in the form of a grill. The grill permits food that is "dropped" on the preparation surface to pass thru the grill to the lower collection tray area 16. Tray area 16 includes removable pans such as 16a, 16b and 16c, with a bottom surface directly exposed to refrigeration so that such "dropped" condiments may be collected and preserved for reuse. Such "dropped" food will usually be an ingredient of the type such as cheese used in pizza prepartion, of which a large quantity is used by the preparer, but some of which misses its intended mark and otherwise drops thru the grill 5 to the collection pans 16 where it is preserved in a refrigerated state. Insulation 17 is included in the walls that confine the refrigerated zones of the unit, including the back wall 7 and the dividing wall 18 that separates the food preparation surface 5 from the refrigerated ingredient tray zone 6. A blower coil unit, conventionally understood in the refrigeration art is shown at 19. A separate rear wall section 20 forms a duct 21 for the flow of refrigerated air to the top of the unit, which includes diffuser plate 22. As will be discussed below, an opening for the flow of air 23 is provided between the front edge of the trays (6a–6q) and the divider wall 18, thru which refrigerated air is circulated. An airflow directing vane or duct is shown at 62a. Although not necessary for the present description, casters or other floor supports for the unit are shown in phantom view 24 and 25; a digital thermometer is shown at 26.

Figure 3:
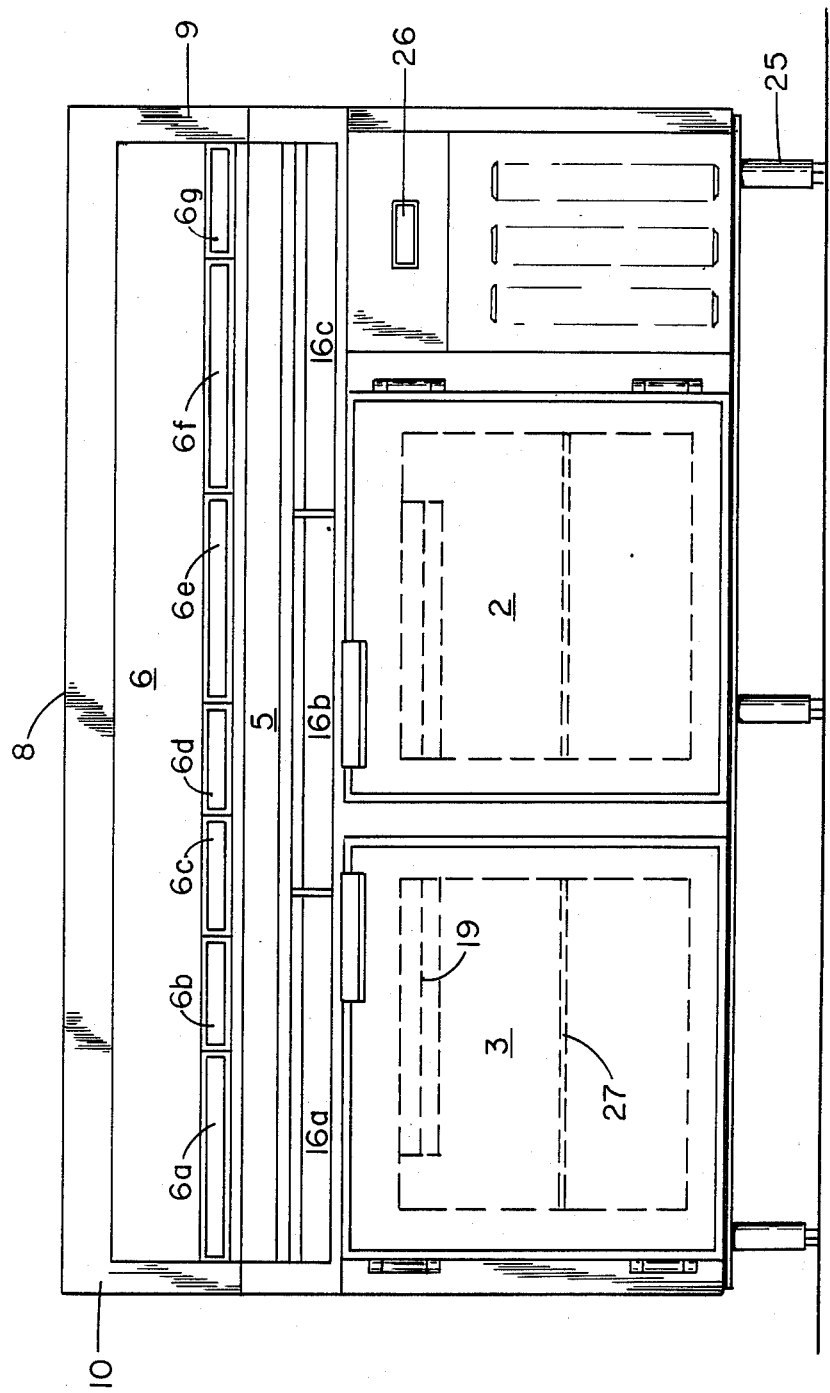
FIG. 3 is a front elevation view of the table of FIG. 1.

In the front elevation view of FIG. 3, like elements are similarly numbered and in phantom depiction there is shown the blower coil 19 and a shelf 27 in the cabinet zone of the overall unit.

Figure 4:
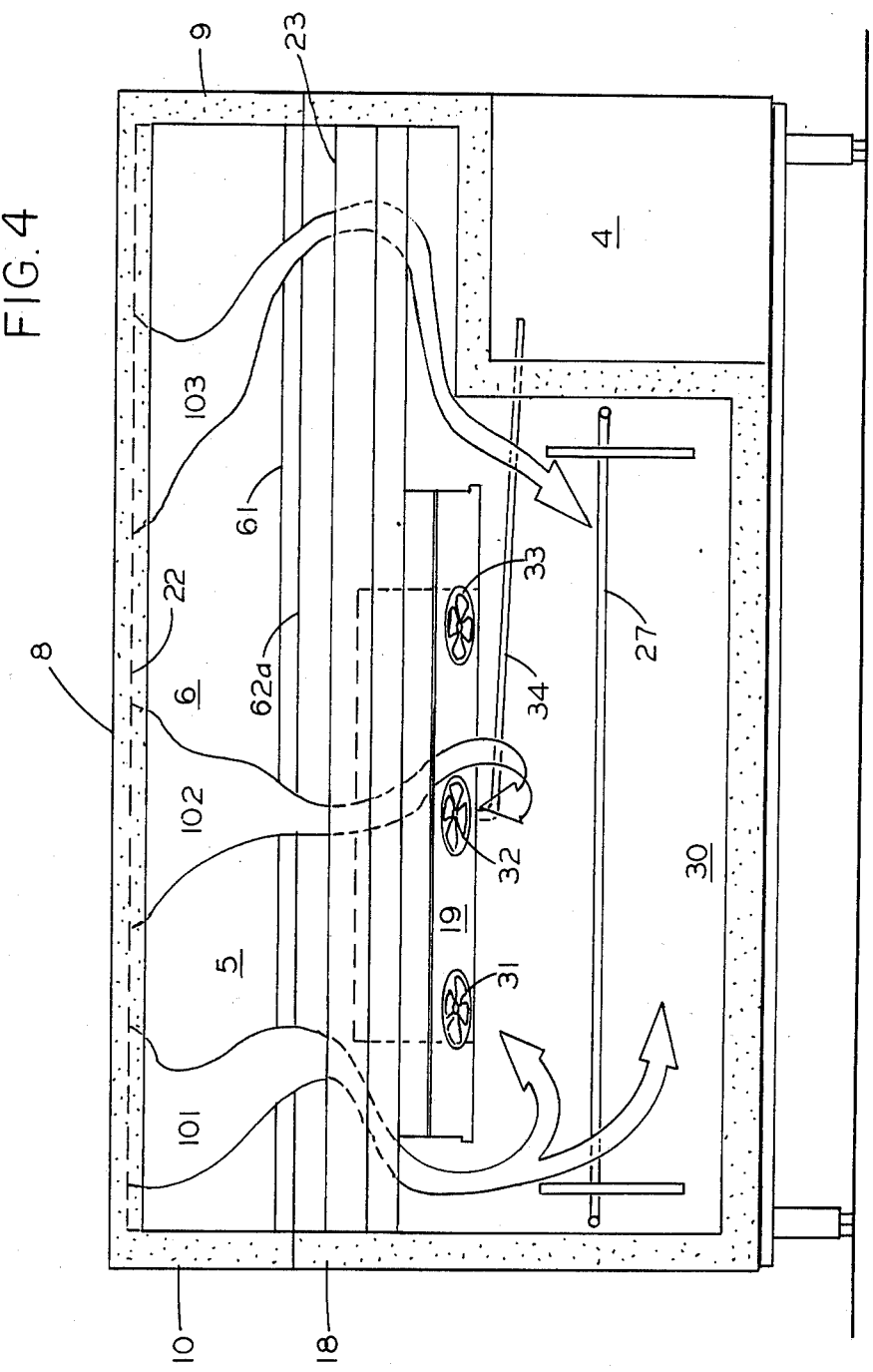
FIG. 4 is a frontal cut away view showing the circulation of refrigerated air through the cabinet and tray zones of the unit.
Figure 5:
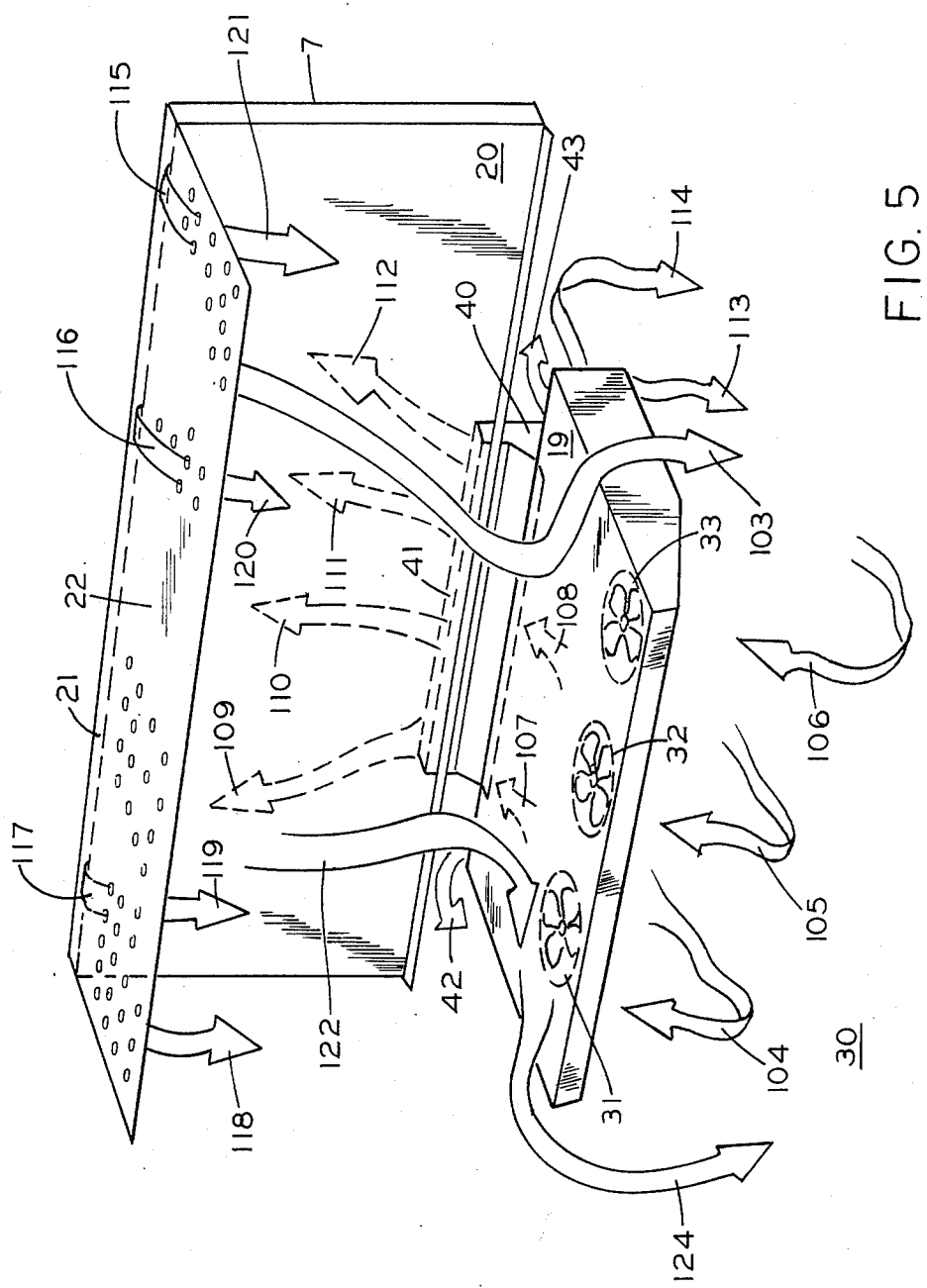
FIG. 5 is a detail drawing further showing the circulation of refrigerated air in the ingredient tray zone and refrigerator cabinet.
Figure 6:
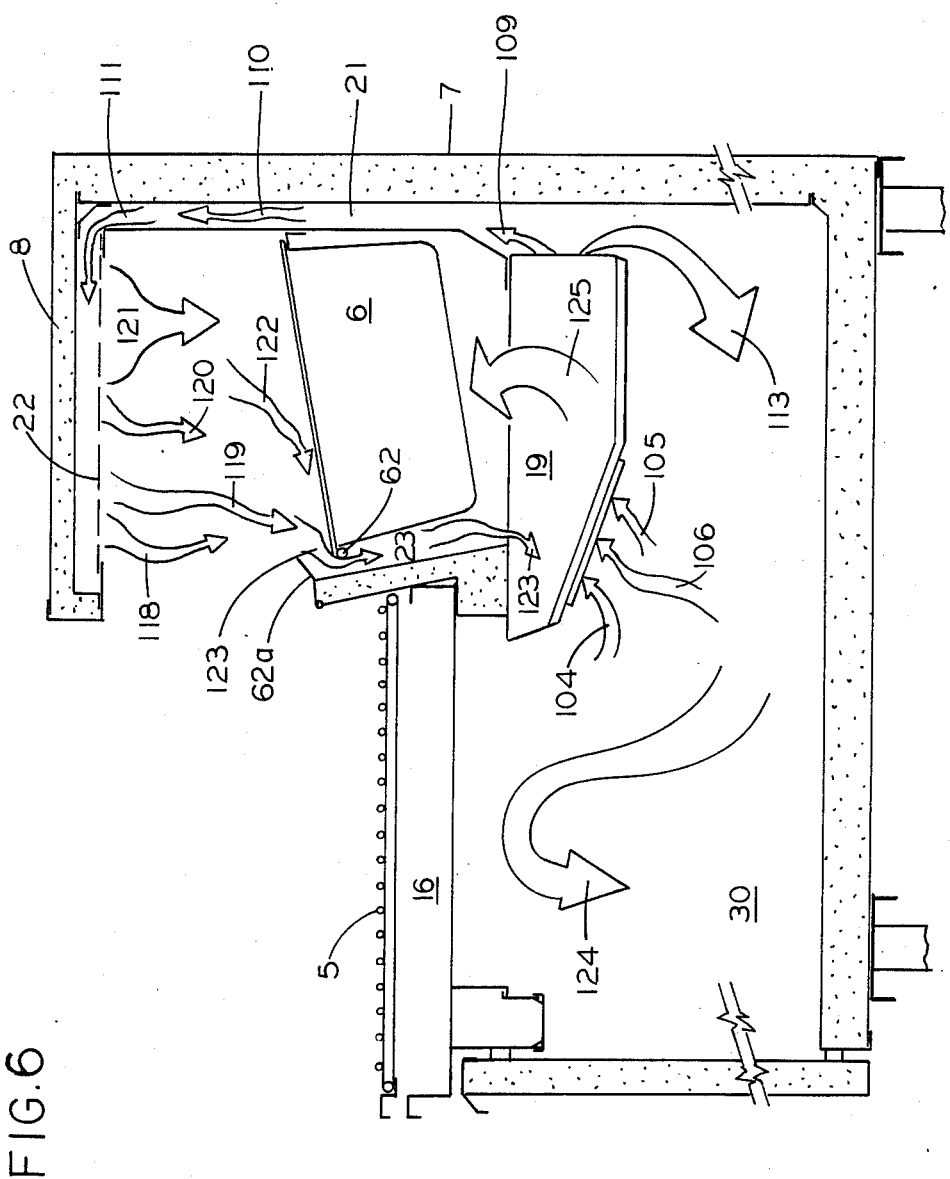
FIG. 6 is a side cross-section view of circulating air flow in the unit taken at section 6—6.

The circulation of refrigerated air thru the unit is shown in FIGS. 4, 5 and 6.

In the front elevation view of FIG. 4, the volume of the enclosed refrigerator cabinet is shown at 30. In a representative embodiment, the blower and evaporator coil unit 19, includes three fans 31, 32 and 33 in the cabinet volume 30. The blower coil unit which provides the circulation of refrigerated air is operatively connected to the refrigeration producing unit in the equipment zone 4, thru a conduit means 34. Dimensions and other operating parameters of any particular unit are matters of design discretion depending on the overall size of the application. For example, in a unit nominally 6 feet in length and 3 feet deep, providing an 18 inch deep food preparation surface, a refrigerator cabinet volume will be approximately 25–30 cubic feet, not including a 4.5 cubic feet equipment zone, less the internal volume occupied by insulation, the evaporator coil, structure and the like. In a unit so sized, a standard 0.5 H.P. condenser rated at 4200 BTU per hour, operatively connected to an equivalently rated 4200 BTU per hour, 40.0 inch×16.0 inch serpentine evaporator coil, based upon a 10° F. temperature differential, will generally provide adequate overall refrigeration capacity, for the unit in a typical kitchen. In such a unit, the internal air circulation through the evaporator coil and in the unit is effected by three fans each having a 5.5 inch diameter blade driven by a 3000 rpm motor to provide 300 cubic feet per minute of air flow each. These are known items in commercial refrigeration applications.

In FIG. 4, it can be seen that air flow occurs thru diffuser plate 22, over the refrigerator food zone 6, thru opening 23 in front of the array of ingredient or condiment pans into the refrigerator volume 30. The representations of air flow 101, 102 and 103 are illustrations only. It is evident that air flow occurs thru the entire surface area of the diffuser and length of the opening 23 in the front area of the ingredient trays.

The detail of FIG. 5 shows the overall air circulation within the unit. Fans 31, 32 and 33 circulate air 104, 105 and 106 thru the blower coil unit 19 from the refrigerator cabinet volume 30; in the unit, the air 107 and 108 is directed to the rear in a first portion thru duct 40 which divides the entire blower coil air flow into first segment 41 (approximately ⅔ the total volume of air flow) that is diverted (air flow illustrations 109–112) into the rear duct 21 adjacent the ingredient zone and a further segment 42 and 43, here divided, that recirculates as indicated at 113 and 114 into the refrigerator cabinet zone, 30. Air flow on side 42 is not shown. The portion of air directed thru duct 21 iso in turn circulated thru a diffuser zone created in the space between diffuser plate 22 and the lower portion of the unit top 8 (not shown). In an embodiment of the nominal size referred to above, a suitable diffuser plate 22 has an overall size of about 15 inches by 66 inches and is approximately 63% open with respect to its overall surface and includes a multiplicity of 5/32 inch perforations to provide this appropriate degree of openness to the circulating air. Thus, air from the duct 115, 116, 117 is diffused over the condiment zone 118–121 and from the condiment zone, thru duct 23, back to the refrigerator cabinet 122–124. Again, it is noted that the representations of air flow are fanciful and used for illustrations only. Actual air flow occurs thru the entire volume of the unit.

In the circulation of the refrigerated air, it is preferable to direct at least a majority of the air flow volume to cool the ingredient or condiment zone. Although the actual proportion need not be exact, in a useful embodiment a proportion in the range of 60% to 70% of the refrigerated air leaving the evaporator coil is directed to the ingredient tray zone and 40% to 30% of the air leaving the coil is directed to the cabinet storage area. This refrigerated air is in continuous circulation.

The cross-section of air flow, shown in FIG. 6, depicts how the diffuser plate directs air downward and over the top of the condiment trays or pans and the manner in which air is returned thru duct 23, at which there is a negative pressure or suction, to the refrigerator cabinet volume for recirculation. The diffuser plate provides a uniform volumetric air flow (or equal volume) over the extended surface of the ingredient tray zone. In this manner, there is a continuous flow of air over the condiments or ingredients which maintains them at a consistent refrigerated temperature, yet permits easy access to the volume quantities in the trays for use at the food preparation surface when individual orders are prepared. Other reference numerals in FIG. 6 illustrating air flow correspond to those of FIGS. 4 and 5. Also, in FIG. 6, the circulation of air to the bottom of the condidment colletion tray beneath the grid at the food preparation surface is shown at 124, as well as circulation of air from the refrigerator volume to the bottom and rear sides of the condiment trays at 125.

Although the objects of the invention are simply stated, the advantages of the unit of the invention are many in its practical application. Thus, for example, food ingredients are consistently maintained at an optimum temperature of 40° F. using available refrigeration at maximum efficiency. The air diffuser plate slows the flow of air and directs it downwardly over the condiment zone. The downwardly directed diffused air flow in the condiment or ingredient zone avoids "spillage" of the refrigeration into the kitchen area, which is often at an ambient temperature of 80° to 85° F. The flow of refrigerated air in the zone is thus confined and isolated both by gravity and the negative pressure created in duct 23 by reason of the air circulation pattern. Cooling efficiency is achieved and recapture of refrigerated air, after it passes over the condiment trays is optimized. The upper surface of the unit 8 also serves as a storage area for trays and utensils and also protects condiments in the trays from dust and other overhead contamination. There are various means by which, for night storage, the access zone, 6, may be secured by a door, panel or other similar means as a front closure therefor. For example an overhead door which slides into a slot recess at the top portion of the cabinet 8 may be provided.

Variations of the unit are also evident. For example the equipment zone may be transversely positioned in the rear of the lower refrigerator cabinet rather than at the side. The collecting trays for condiments shown here having a bottom exposed to refrigeration cabinet zone, may be mounted on top on an already enclosed zone, and/or an auxiliary cooling plate may be added as an option to maintain the collecting zone for dropping food at a proper refrigerated temperature.

In brief the unit provides a solution to the problem of maintaining food preparation ingredients at a safe, healthful temperature while permitting convenient access to volume quantities. In this manner restaurant health considerations are satisfied and economic advantage in food preservation is achieved.

These advantages are obtained by the invention and its variations which is claimed as follows:

1. A food preparation table including a means for maintaining foodstuffs in a continuous refrigerated state including:
   a work surface operatively disposed above a refrigerated area providing a work zone in which food ingredients are assembled; the food preparation table including a collection pan beneath the work surface, said work surface including a series of spaced openings of predetermined size thru which food pieces will pass to the collection pan and in which at least the bottom surface of the collection pan is refrigerated; said work surface being adjacent a refrigerated ingredient zone in which food ingredients are maintained in an accessible open relationshp with respect to the work surface;
   an enclosure for the refrigerated ingredient zone adjacent said work surface; said enclosure presenting an open front facing the work surface and having a fixed top surface extending above the food ingredients and including a means for providing a circulating flow of diffused refrigerated air flowing over the top surface of the food ingredients; said means including a cooperating diffuser plate and an air duct at separate locations adjacent the ingredient zone, whereby refrigerated air will flow between the plate and duct over the food ingredients; and
   a source of refrigeration for providing refrigeration adjacent the work surface and for providing the circulating flow of diffused refrigerated air over the top surface of the food ingredients in the refrigerated ingredient zone;
said work surface being the upper surface of a lower cabinet on which lower cabinet the enclosure for the ingredient zone is mounted and in which cabinet the source of refrigeration is contained in a separate zone.

2. The food preparation table of claim 1 in which the work surface comprises an arrangement of spaced extending rod elements in the form of a grill.

3. The food preparation table of claim 1 or claim 2 in which the same source of refrigeration provides refrigeration for the circulating flow of diffused refrigerated air flowing over the ingredient zone and for the refrigeration adjacent the work surface.

4. The food preparation table of claim 1 or claim 2 including a refrigerated cabinet beneath the work surface, which refrigerator cabinet includes a means therein to provide the circulation of refrigerated air between the duct and diffuser adjacent the ingredient zone and the cabinet, and in which the bottom surface of the collection pan is exposed to the refrigeration maintained in the refrigerated cabinet and operatively provides the refrigeration for the work surface disposed above said pan.

* * * * *